(12) United States Patent
Irizzary

(10) Patent No.: US 6,367,425 B1
(45) Date of Patent: Apr. 9, 2002

(54) SPUR GLOVE FOR BIRDS

(76) Inventor: Pedro Irizzary, 11361 Wadsworth Rd., Beach Park, IL (US) 60099

( * ) Notice: Subject to any disclaimer, the term of this patent is extended or adjusted under 35 U.S.C. 154(b) by 0 days.

(21) Appl. No.: 09/714,239

(22) Filed: Nov. 16, 2000

(51) Int. Cl.[7] .............................................. A01K 13/00
(52) U.S. Cl. .................................................... 119/851
(58) Field of Search .............................. 119/851, 850, 119/715, 837

(56) References Cited

U.S. PATENT DOCUMENTS

| | | | | |
|---|---|---|---|---|
| 1,467,769 A | * | 9/1923 | Tagert | 119/837 |
| 2,197,537 A | * | 4/1940 | Cheeley | 119/851 |
| 3,224,412 A | * | 12/1965 | Fuentes, Jr. | 119/851 |
| 3,273,540 A | * | 9/1966 | Fuentes | 119/851 |
| 3,771,786 A | * | 11/1973 | Bouldin | 273/455 |
| 4,432,545 A | | 2/1984 | Vanderpool | |
| 5,967,096 A | | 10/1999 | Irizarry | |

* cited by examiner

Primary Examiner—Charles T. Jordan
Assistant Examiner—Judith A. Nelson
(74) Attorney, Agent, or Firm—Jansson, Shupe & Munger, Ltd.

(57) ABSTRACT

A spur-shrouding device with a spur cover forming a spur-receiving cavity and a retaining strap preferably integrally-formed therewith, and characterized by a penetration-resistant member secured adjacent to the cavity to prevent the spur from rupturing the spur cover. The spur cover and penetration-resistant member are preferably of first and second elastomeric materials, respectively, the second having a greater hardness than the first. The penetration-resistant member, which is preferably configured to secure its position, to fully protect the spur cover and to facilitate spur-cover molding, is preferably pre-formed and the spur cover is molded around the penetration-resistant member such that it forms the closed end of the cavity.

20 Claims, 3 Drawing Sheets

SPUR GLOVE FOR BIRDS

FIELD OF THE INVENTION

The invention relates generally to animal husbandry and, more particularly, to body-worn protective shields used in connection with birds and bird handling.

BACKGROUND OF THE INVENTION

While the legs of many species of birds are free of spurs or have only vestigial spurs, other species such as pheasants, turkeys and chickens have very pronounced spurs. Birds with spurs instinctively know how to use them in defense or aggression.

In the case of mass-produced farm birds, such as chickens and turkeys raised for food, injuries (to birds) caused by birds are of scant concern. But in the case of birds which are specially bred for show or in anticipation of a prize or recognition, injury is a greater concern—often much greater. For example, a specially-bred prize turkey may be worth several hundred dollars when free of injury, but the same bird becomes essentially worthless if, for example, it is blinded in one eye by the spur of another bird. In this connection, it should be appreciated that birds are relatively fragile, and it takes very little by way of a scratch or blow from a spur to inflict injury, especially to the eye.

The matter of potential injury is aggravated by the fact that it is not uncommon to keep two or more birds in a single cage. Some breeds of birds tend to be more high-strung and "edgy" than others, and have a propensity to fight when they are kept in a cage.

Some breeders of birds remove substantially the entirety of both leg spurs; in such cases a bird is said to have "slipped spurs." But a stump remains and, even in such cases, birds instinctively use that part of the leg for defense or aggression. In other words, whether birds have full spurs or mere spur stumps, covering the spurs can be important in preventing bird injury.

To help prevent spur-related injuries to birds, spur "muffs" have been available for many years. One type of muff has a generally spherical outer cover made of sewn vinyl or leather stuffed with a padded fabric liner having a depression which receives the spur when the muff is fitted to the bird's leg. A significant recent improvement is the molded elastomeric spur-shrouding device disclosed in U.S. Pat. No. 5,967,096 (Irizarry, the inventor herein), entitled "Spur Glove for Birds." The present invention is a significant improvement over such prior art, The prior art elastomeric spur-shrouding device includes an integrally-molded spur cover and retaining strap. The spur cover forms a spur-receiving cavity which extends generally along an axis from an open end to a closed end. The retaining strap extends from the spur cover and has an aperture in it. The strap is wound around the leg of the bird and then applied over the spur cover such that the spur cover is inserted through the aperture, to hold the device in place.

The spur cover, which is usually an elastomeric material having a hardness of no more than about 25 durometer (most typically about 15) on a Shore A hardness scale and a percent elongation of at least 300% (most typically at least 600%), has a fairly thick wall (for example, from about 0.25 to 0.5 inch) in order to properly cover the spur. Despite such shielding, however, covered spurs can be poked through and/or ruptured, depending upon a number of factors, including the size of a particular spur and the fury with which the bird exercises its aggressive or defensive instincts. This drawback is contrary to the purposes of the spur-shrouding device, and is also harmful to the spur-shrouding.

Placing a loose insert disk with greater puncture resistance (than the spur cover itself) into the closed end of the spur-receiving cavity is inadequate as a proposed solution of the aforementioned problems. Such devices tend not to stay either in the right position or in the right orientation at such position, and are easily prone to dislodgement by interaction with the spur. Furthermore, they fail to provide adequate protection for the spur cover material.

An improved spur-shrouding device addressing the aforementioned problems and shortcomings would be an important advance in the field of this invention.

OBJECTS OF THE INVENTION

It is an object of the invention to provide an improved spur-shrouding device overcoming some of the problems and shortcomings of the prior art.

Another object of the invention is to provide an improved device for protecting birds having spurs.

Another object of the invention is to provide an improved spur-shrouding device which resists punctures and is highly durable.

Another object of the invention is to provide an improved spur-shrouding device which readily accommodates spurs of significantly varying lengths.

Another object of the invention is to provide an improved spur-shrouding device which withstands substantial abuse caused by active and aggressive birds.

Still another object of the invention is to provide a spur-shrouding device with a penetration-resistant internal member which is reliably held in its position and orientation within a spur cover.

Another object of the invention is to provide an improved spur-shrouding device with a penetration-resistant internal member which resists rotation and dislodgement despite many different kinds of abuse.

These and other objects will be apparent from the descriptions herein.

SUMMARY OF THE INVENTION

The invention is an improved device for shrouding the spur of a bird to prevent the bird from injuring other birds. The device is an improvement in devices of the kind including a spur cover forming a spur-receiving cavity which extends generally along an axis from an open end to a closed end, and a retaining strap extending from the spur cover. The improved spur-shrouding device includes a penetration-resistant member secured adjacent to the cavity and positioned and arranged to prevent the spur from poking through and rupturing the spur cover.

In preferred embodiments, the spur cover is formed of a first elastomeric material having a first hardness, and the penetration-resistant member within the spur cover is formed of a second elastomeric material of a second hardness greater than the first hardness. In certain preferred embodiments, the first hardness is less than about 40 durometer measured on a Shore A hardness scale, and the second hardness is about 40–100 durometer measured on a Shore A hardness scale. More preferably, the penetration-resistant member has a Shore A hardness of about 45–70 durometer, such that the penetration-resistant member is soft enough to be deformable with the spur cover material. Most preferably the spur cover is of a material having a Shore A hardness no greater than about 25 durometer and a percent elongation of at least 300%.

As with certain prior devices, the spur cover and retaining strap are preferably an integrally-molded structure and the retaining strap has an aperture therein such that the retaining strap may be wound around the leg of the bird and the spur cover thereafter inserted through the aperture, to secure the spur-shrouding device in place.

It is highly preferred that the penetration-resistant member be pre-formed and have a spur-engageable surface, and that the spur cover be molded around the penetration-resistant member in a manner such that at least a portion of the spur-engageable surface is at the closed end of the spur-receiving cavity.

The penetration-resistant member preferably has an end portion which forms an endwall at the end of the cavity and is oriented transverse to the axis of the cavity, and a sidewall portion which extends from the endwall toward the open end of the spur cover and has an inner surface surrounding the cavity. This configuration allows the penetration-resistant member to protect substantial portions of the spur cover from the spur, including lateral walls of the cavity. The inner surface of the sidewall portion of the penetration-resistant member is preferably tapered such that the cavity is of progressively smaller cross-sections at positions progressively closer to the endwall. This limits the range of free movement of the spur within the cavity of the spur-shrouding device.

In certain preferred embodiments, the sidewall portion of the penetration-resistant member has an outer surface, and the end portion includes a peripheral edge portion extending beyond the outer surface of the sidewall portion. This arrangement allows spur-cover material along the peripheral edge portion and along the outer surface of the sidewall aid in securing the penetration-resistant member in place.

The peripheral edge portion of the end portion of the penetration-resistant member most preferably has openings through it, preferably spaced openings. This arrangement serves to allow flow of the first elastomeric material therethrough during molding of the spur cover around the penetration-resistant member, and further aids in securing the penetration-resistant member in place within the spur cover.

Certain preferred embodiments also include anti-rotation structure projecting radially outwardly from the outer surface of the sidewall portion of the penetration-resistant member. This serves to prevent rotation of the penetration-resistant member within the spur cover. The anti-rotation structure preferably includes plurality of substantially axially-parallel elongate members extending from the peripheral edge portion toward the open end of the spur cover. Such elongate members provide substantial resistance preventing unwanted relative rotation, and assuring appropriate positioning and orientation of the penetration-resistant member in the spur cover.

The invention involves a penetration-resistant member secured within the spur-receiving cavity of a spur cover, the penetration-resistant member being positioned and arranged to prevent the spur from poking through and rupturing the spur cover.

The invention also involves a method of manufacturing the above-described spur-shrouding device. The method involves pre-forming the penetration-resistant member described above and then injection molding the spur cover around such penetration-resistant member.

Other details of the new device are set forth in the following description and in the drawings.

DETAILED DESCRIPTION OF PREFERRED EMBODIMENTS

Figure 1:
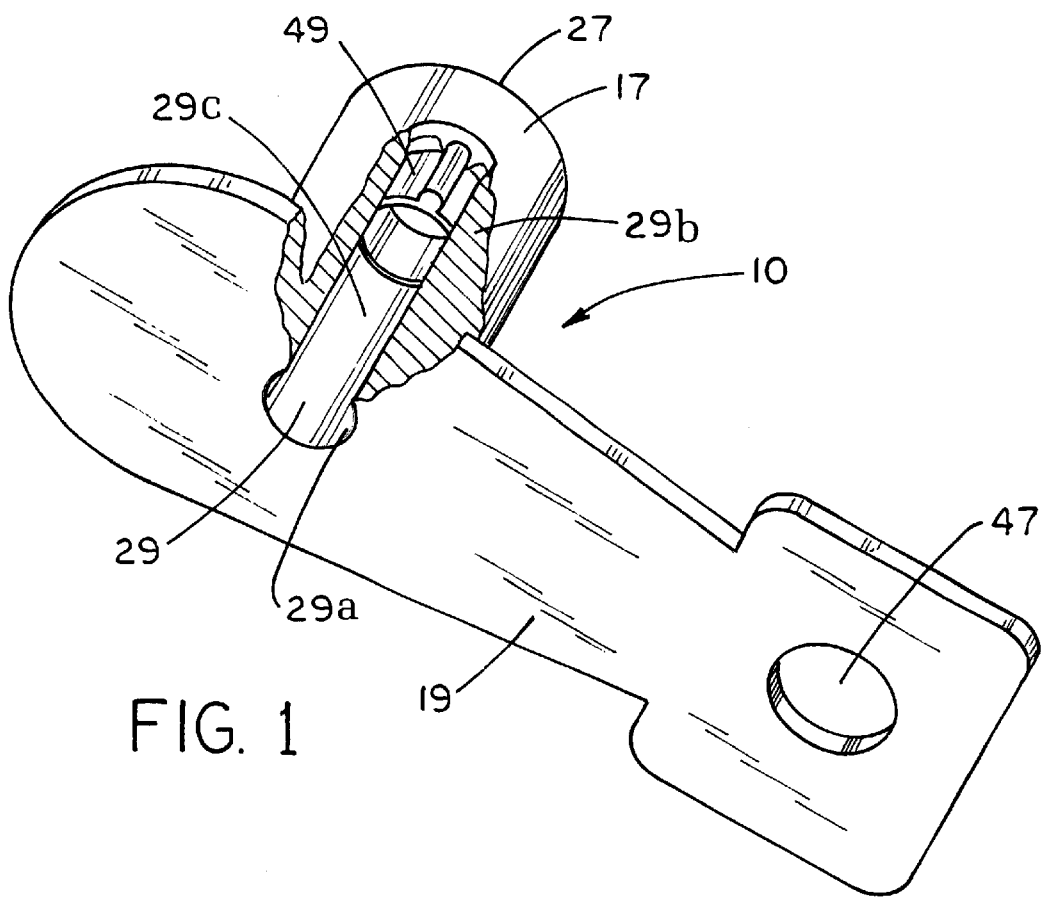
FIG. 1 is a partially broken-away perspective view of a preferred spur-shrouding device in accordance with this invention.
Figure 2:
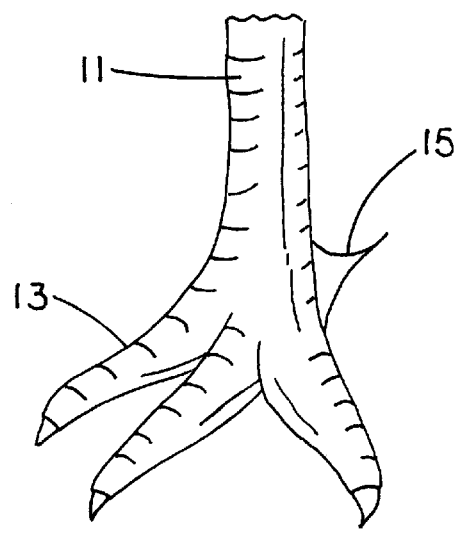
FIG. 2 is a perspective view of the foot and leg of a bird and the spur thereon which is covered when the device of this invention is mounted about the leg.

FIGS. 1 and 2–6 illustrate an improved spur-shrouding device 10. However, before describing spur-shrouding device 10 in detail by reference to such figures, it will be helpful to understand the anatomy of a bird of the type having spurs, and for that purpose attention is directed to FIG. 2, which shows the leg 11 and foot 13 of a bird such as a turkey, chicken or pheasant. A sharply-pointed spur 15 projects rearwardly and upwardly from the leg-foot juncture. It is the unshrouded spur 15 by which a bird is capable of inflicting injury to other birds.

Spur-shrouding device 10 includes a spur cover 17, a penetration-resistant member 49, and a flexible strap 19 which is integrally molded with spur cover 17. A method for manufacture of spur-shrouding device 10 is described below. Spur cover 17, which has an outer surface 27, is bulb-like at its distal end and is generally cylindrical in shape along a portion of its length. A variety of other shapes may be used without departing from the spirit of the present invention.

Spur cover 17 forms a spur-receiving cavity 29 for receiving spur 15 of the bird to which spur-shrouding device 10 is fitted. Cavity 29 extends generally along an axis A from an open end 29a to a closed end 29b and has a lateral wall 29c extending therebetween. Cavity 29 is generally cylindrical in shape. The distance between closed end 29b of cavity 29 and the distal outside end of spur cover 17 is about ⅜ inch.

Figure 3:
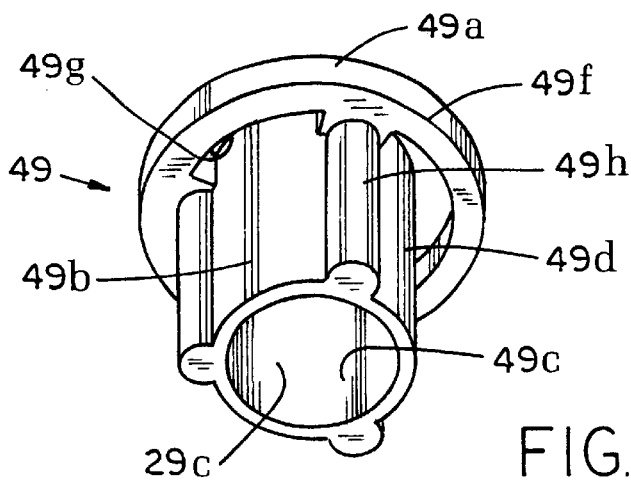
FIG. 3 is an enlarged perspective view of the penetration-resistant member forming an internal part of the device of FIG. 1.
Figure 4:
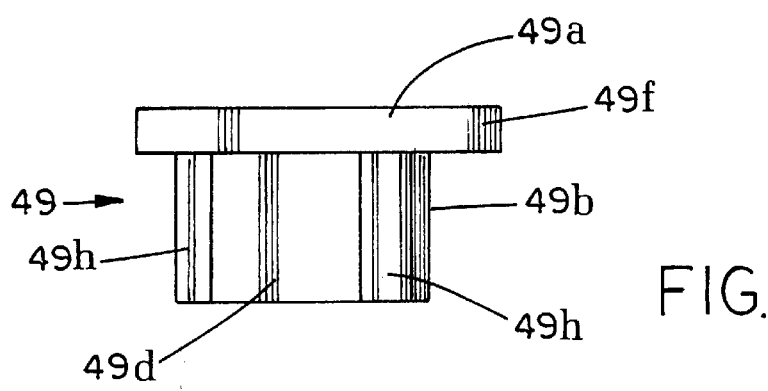
FIG. 4 is a side elevation of FIG. 3.
Figure 5:
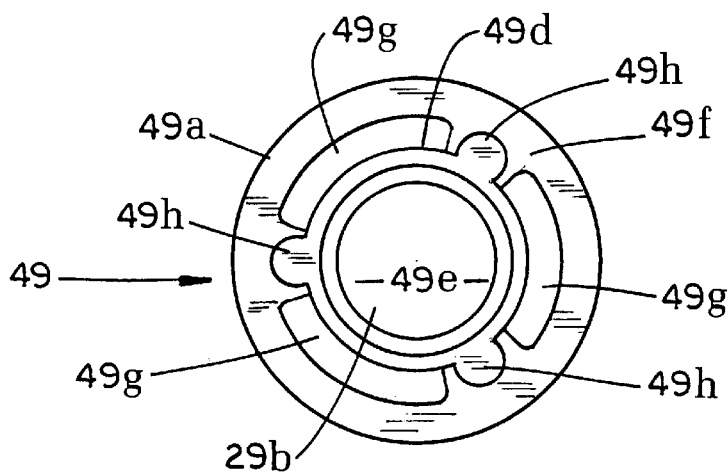
FIG. 5 is a bottom view of FIG. 4.
Figure 6:
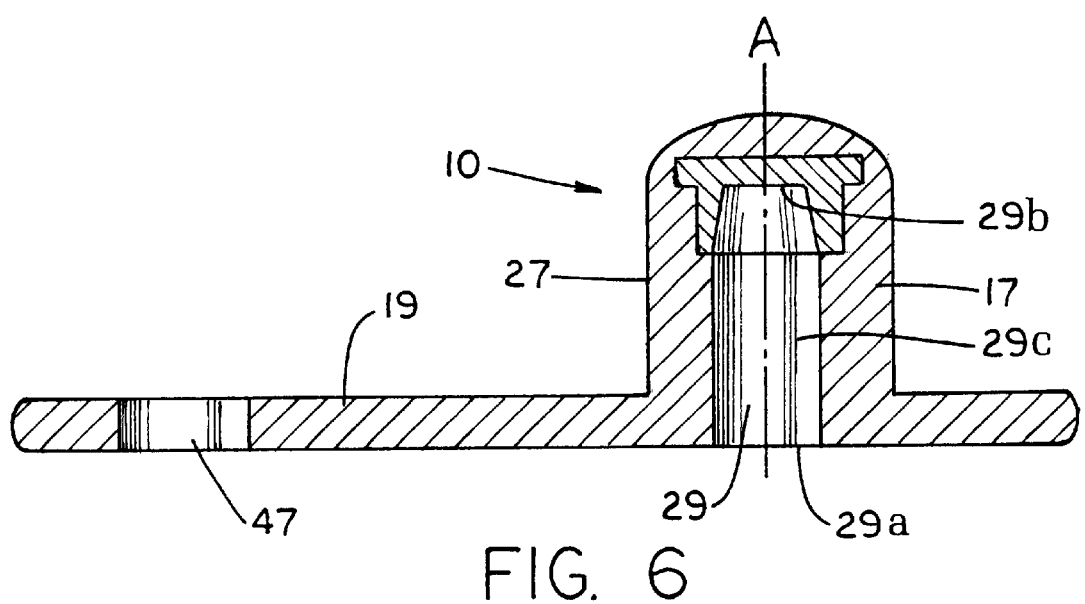
FIG. 6 is a mid-line side sectional view the device of FIG. 1, such section being taken along the length of the device.

Penetration-resistant member 49 is secured within spur-receiving cavity 29 at closed end 29b, and in fact forms closed end 29b. FIGS. 3–5 illustrate details of penetration-resistant member 49, including its end portion 49a and its sidewall portion 49b.

Sidewall portion 49b, which extends from end portion 49a toward open end 29a of spur-receiving cavity 29, has an inner surface 49c which borders and surrounds. cavity 29 and forms a part of lateral wall 29c of cavity 29. Sidewall portion 49b of penetration-resistant member 49 also has an outer surface 49d which is generally of cylindrical configuration. End portion 49a forms an endwall 49e, which provides closed end 29b of spur-receiving cavity 29, and also includes a peripheral edge portion 49f which extends radially beyond outer surface 49d of sidewall portion 49b. Peripheral edge portion 49f of end portion 49a has three openings 49g therethrough. Inner surface 49c of sidewall portion 49b and the inside surface of endwall 49e together serve as a spur-engageable surface of penetration-resistant member 49.

Penetration-resistant member 49, which is a single pre-molded piece, is positioned and oriented within spur cover 17 such that endwall 49e is centered on axis A with endwall 49e perpendicular to axis A. Pre-formed penetration-resistant member 49 is secured within spur cover 17 by injection molding of spur cover 17 around penetration-resistant member 49, such injection molding also serving to mold flexible strap 19. Such injection molding secures penetration-resistant member 49 in place while leaving inner surface 49c and the inside surface of endwall 49e exposed to spur-receiving cavity 29, in position for spur engagement.

During such injection molding, the elastomeric material forming spur cover 17 flows through openings 49g. The material forming spur cover 17 thus moves into positions, including positions within openings 49g and positions adjacent to outer surface 49d of sidewall portion 49b and positions adjacent to peripheral edge portion 49f of end portion 49a, which serve to reliably secure penetration-resistant member 49 in place within spur cover 17.

Sidewall portion 49b of penetration-resistant member 49 also includes three peripherally-spaced elongate members 49h which extend from peripheral edge portion 49f of end portion 49a toward open end 29a of spur-receiving cavity 29. Elongate members 49h, which are parallel to one another and to axis A, serve to further prevent rotation of penetration-resistant member 49.

Spur cover 17 is formed of a first elastomeric material having a first hardness, and penetration-resistant member 49 is formed of a second elastomeric material of a second hardness greater than the first hardness. Suitable materials for spur cover 17 include a wide variety of thermoplastic elastomers (TPEs) having a Shore A hardness of less than about 40 durometer. It is highly preferred that spur cover 17 be of a material having Shore A hardnesses of less than about 25 durometer and percent elongations of at least about 300%, with the most preferred materials having Shore A hardnesses on the order of 15 durometer and percent elongations of at least about 600%. One particularly preferred material for spur cover 17 is an S-EB-S compound, a block copolymer sold under the trade name Dynaflex® G6713 by GLS Corporation, McHenry, Ill., which has a Shore A hardness of about 15 durometer.

Many different materials are suitable for penetration-resistant member 49. It is preferred to use elastomeric materials having Shore A hardnesses of about 40–100 durometer, preferably about 45–70 durometer. Such hardnesses allow penetration-resistant member 49 to prevent spur 15 from poking through and rupturing spur cover 17, while also providing suitable cushioning and allowing the softer material of spur cover 17 to prevent injuries to other birds. Among such elastomeric materials, TPEs based on hard polymer/elastomer combinations including polypropylene, EPDM, urethanes, polyesters or polyamids are particularly preferred. One particularly preferred material is a polypropylene combined with EPDM, such material having a Shore A hardness of about 55 durometer.

Retaining strap 19 has a slip-resistant surface by virtue of surface roughness (not shown) which resists slippage when retaining strap 19 is wrapped about leg 11 of the bird. Strap 19 has an aperture 47 through it near its end. As is known in the prior art, aperture 47 is sized to fit over spur cover 17 to serve the purpose of holding the spur-shrouding device in place over spur 15 after spur-shrouding device 10 has been wrapped around leg 11.

While the principles of the invention have been shown and described in connection with a few preferred embodiments, it is to be understood clearly that such embodiments are by way of example and are not limiting.

What is claimed is:

1. In a device for shrouding a spur of a bird, of the type including (1) a spur cover forming a spur-receiving cavity which extends generally along an axis from an open end to a closed end and (2) a retaining strap extending from the spur cover, the improvement comprising a penetration-resistant member secured adjacent to the cavity and positioned and arranged to prevent the spur from poking through and rupturing the spur cover.

2. The spur-shrouding device of claim 1 wherein:
   the spur cover is of a first elastomeric material having a first hardness; and
   the penetration-resistant member is of a second elastomeric material of a second hardness greater than the first hardness.

3. The spur-shrouding device of claim 2 wherein:
   the spur cover and retaining strap are an integrally-molded structure; and
   the retaining strap has an aperture therein such that the retaining strap may be wound around the leg of the bird and the spur cover may be inserted through the aperture.

4. The spur-shrouding device of claim 2 wherein:
   the first hardness is less than about 40 durometer measured on a Shore A hardness scale; and
   the second hardness is about 40–100 durometer measured on a Shore A hardness scale.

5. The spur-shrouding device of claim 4 wherein the second hardness is about 45–70 durometer, whereby the penetration-resistant member is soft enough to be deformable with the spur cover material.

6. The spur-shrouding device of claim 5 wherein the first hardness is no greater than about 25 durometer and the spur cover has a percent elongation of at least 300%.

7. The spur-shrouding device of claim 2 wherein:
   the penetration-resistant member is pre-formed and has a spur-engageable surface; and
   the spur cover is molded around the penetration-resistant member such that at least a portion of the spur-engageable surface is at the closed end of the cavity.

8. The spur-shrouding device of claim 7 wherein the penetration-resistant member comprises:
   an end portion forming an endwall at the end of the cavity and oriented transverse to the axis of the cavity; and
   a sidewall portion extending from the endwall toward the open end of the spur cover and having an inner surface surrounding the cavity,
whereby the penetration-resistant member protects substantial portions of the spur cover from the spur.

9. The spur-shrouding device of claim 8 wherein the inner surface is tapered such that the cavity is of progressively smaller cross-sections at positions progressively closer to the endwall.

10. The spur-shrouding device of claim 8 wherein:
    the sidewall portion has an outer surface; and
    the end portion includes a peripheral edge portion extending beyond the outer surface of the sidewall portion,
whereby spur-cover material along the peripheral edge portion and along the outer surface of the sidewall aids in securing the penetration-resistant member in place.

11. The spur-shrouding device of claim 10 wherein the peripheral edge portion has openings therethrough, thereby to allow flow of the first elastomeric material therethrough during molding of the spur cover and to further aid in securing the penetration-resistant member in place.

12. The spur-shrouding device of claim 11 wherein:
    the spur cover and retaining strap are an integrally-molded structure; and
    the retaining strap has an aperture therein such that the retaining strap may be wound around the leg of the bird and the spur cover may be inserted through the aperture.

13. The spur-shrouding device of claim 11 wherein:
   the first hardness is less than about 40 durometer measured on a Shore A hardness scale; and
   the second hardness is about 40–100 durometer measured on a Shore A hardness scale.

14. The spur-shrouding device of claim 13 wherein the second hardness is about 45–70 durometer, whereby the penetration-resistant member is soft enough to be deformable with the spur cover material.

15. The spur-shrouding device of claim 14 wherein the first hardness is no greater than about 25 durometer and the spur cover has a percent elongation of at least 300%.

16. The spur-shrouding device of claim 11 further including anti-rotation structure projecting radially outwardly from the outer surface of the sidewall portion, thereby to prevent rotation of the penetration-resistant member within the spur cover.

17. The spur-shrouding device of claim 16 wherein the anti-rotation structure comprises a plurality of substantially axially-parallel elongate members extending from the peripheral edge portion toward the open end of the spur cover.

18. The spur-shrouding device of claim 17 wherein the peripheral edge portion has openings therethrough between adjacent pairs of the elongate members, thereby to allow flow of the first elastomeric material therethrough during molding of the spur cover and to further aid in securing the penetration-resistant member in place.

19. In a device for shrouding a spur of a bird, of the type with a spur cover forming a spur-receiving cavity and a retaining member on the spur cover, the improvement comprising a penetration-resistant member secured adjacent to the cavity and positioned and arranged to prevent the spur from poking through and rupturing the spur cover.

20. A method for manufacture of a spur-shrouding device having a spur cover forming a spur-receiving cavity and a retaining member on the spur cover, comprising:
   pre-forming a penetration-resistant member having a spur-engageable surface; and
   injection molding the spur cover around the pre-formed penetration-resistant member such that at least a portion of the spur-engageable surface is at the closed end of the cavity.

* * * * *